United States Patent [19]

Sikora

[11] Patent Number: 4,800,323
[45] Date of Patent: * Jan. 24, 1989

[54] SINGLE-ENDED SELF-OSCILLATING DC-DC CONVERTER FOR INTERMITTENTLY ENERGIZED LOAD HAVING $V_{BE}$ RESPONSIVE CURRENT LIMIT CIRCUIT

[75] Inventor: Scott T. Sikora, Mesa, Ariz.

[73] Assignee: Tomar Electronics, Inc., Tempe, Ariz.

[*] Notice: The portion of the term of this patent subsequent to Jul. 21, 2004 has been disclaimed.

[21] Appl. No.: 74,697

[22] Filed: Jul. 17, 1987

Related U.S. Application Data

[63] Continuation of Ser. No. 794,415, Nov. 4, 1985, Pat. No. 4,682,081.

[51] Int. Cl.⁴ .................. H05B 41/29; H05B 41/34
[52] U.S. Cl. .......................... 315/219; 315/241 R; 315/241 S; 315/289; 315/DIG. 7; 363/19; 363/131
[58] Field of Search ............. 315/241 R, 241 S, 209, 315/219, 224, DIG. 7; 363/18, 19, 21, 97, 131; 331/112

[56] References Cited

U.S. PATENT DOCUMENTS

| | | | |
|---|---|---|---|
| 3,331,033 | 7/1967 | Johnston | 363/18 |
| 3,504,263 | 8/1970 | Schaefer | 363/19 |
| 3,523,235 | 8/1970 | Schaefer | 363/19 |
| 4,131,843 | 12/1978 | Koyama et al. | 363/21 |
| 4,682,081 | 7/1987 | Sikora | 315/219 |

Primary Examiner—David K. Moore
Assistant Examiner—Michael Razavi
Attorney, Agent, or Firm—Cahill, Sutton & Thomas

[57] ABSTRACT

The converter delivers current to an intermittently energized load and includes a coupled inductor having a primary winding, a secondary winding and a feedback winding. A switching transistor is coupled in series with the primary winding of the inductor and switches between conductive and non-conductive states to control the flow of current through the primary winding. A positive drive circuit provides positive bias voltage to the switching transistor. A current limiting circuit senses the voltage across the base-emitter junction of the switching transistor to measure the primary winding current, removes the positive bias voltage when the primary winding current reaches a predetermined value, and thereby switches the transistor out of the conductive state into the non-conductive state. A semiconductor switch includes a control lead coupled to a voltage divider which applies a scaled voltage to the control lead causing the semiconductor switch to conduct when the switching transistor base-emitter voltage reaches a predetermined current limit voltage representative of a preselected switching transistor collector current limit. The semiconductor switch then shunts the positive bias voltage away from the switching transistor base and switches that transistor into the non-conductive state.

20 Claims, 3 Drawing Sheets

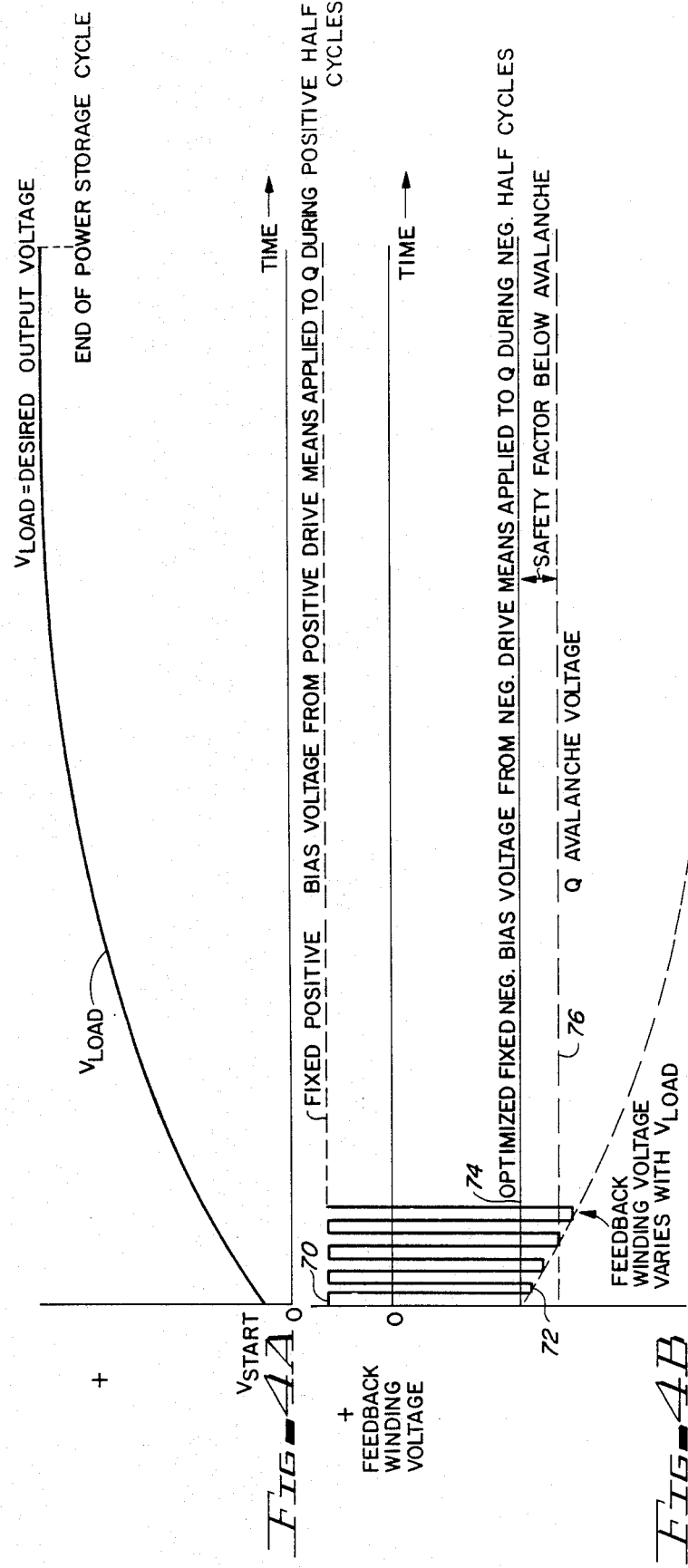

SINGLE-ENDED SELF-OSCILLATING DC-DC CONVERTER FOR INTERMITTENTLY ENERGIZED LOAD HAVING $V_{BE}$ RESPONSIVE CURRENT LIMIT CIRCUIT

This is a Continuation application of U.S. patent application Ser. No. 794,415, filed Nov. 4, 1985 now U.S. Pat. No. 4,682,081.

BACKGROUND OF THE INVENTION

1. Field of the Invention

This invention relates to power supplies, and more particularly to power supplies which include a current-mode control system for sensing the inductor primary winding current level.

2. Description of the Prior Art

Prior art current-mode controlled power supplies utilize various types feedback systems to limit the peak current flow through the primary winding of a coupled inductor. Generally a resistor or a current transformer is coupled in series with a switching transistor to sense the current level in the primary winding. Both of these current level sensing elements induce losses and reduce the power supply efficiency level.

Prior art current-mode controlled power supplies use various techniques to transition the switching transistor from a conductive state into a non-conductive state when the primary winding current sensing circuit detects that the maximum desired primary winding current level has been reached. In accomplishing this switching function, some power supply circuits remove the positive bias voltage from the switching transistor, while other circuits incorporate a negative bias supply which initially provides a low level bias voltage which increases magnitude during the output capacitor charging cycle. When the negative bias voltage level is low, the switching circuit is comparatively unstable and inefficient. Toward the end of the capacitor charging cycle, the negative bias voltage increases to a level which exceeds the switching transistor avalanche breakdown voltage producing highly inefficient operation and excessive heat dissipation.

For the reasons discussed above, prior art current-mode controlled power supplies typically operate at efficiency levels of from between fifty to about seventy percent.

U.S. Pat. No. 4,321,507 (Bosnak) discloses a strobe power supply utilizing a coupled inductor having a primary winding, a secondary winding, a feedback winding and a drive winding. Current transformer $T_2$ is inserted in the switching transistor emitter circuit to sense the primary winding current level so that the switching transistor can be switched from the conductive state into the non-conductive state at a predetermined maximum current level. This current-mode controlled power supply controls the operation of the switching transistor by applying and removing a positive bias voltage. It does not provide negative bias voltage to the switching transistor in the non-conductive state.

U.S. Pat. No. 3,417,306 (Knak) discloses a strobe power supply circuit including an inductor having primary, secondary and feedback windings. The feedback winding is coupled to provide a negative bias voltage to the switching transistor when the switching transistor is in the non-conductive state. The magnitude of the negative bias voltage varies with changes in the power supply output voltage.

In an article entitled "Current-Sensing IC Improves Regulation of Power Supplies", Electronic Products, June 17, 1985, pages 77-82, Glenn Fritz describes a current-mode controlled power supply utilizing a specialized integrated circuit in the power supply control logic. In the description accompanying FIG. 7 at page 82 of this article, the author indicates that the FIG. 7 power supply operates at a seventy percent efficiency level at full load. FIG. 1 at page 78 of this article depicts a power supply utilizing a current sensing resistive feedback element. At page 80, right hand column, the author indicates that a current transformer may be utilized as a primary winding current level measuring device.

SUMMARY OF THE INVENTION

It is therefore a primary object of the present invention to provide a current-mode controlled power supply which measures the inductor primary winding current level by sensing switching transistor base voltage.

Another object of the present invention is to provide a current-mode controlled power supply which provides an optimized, fixed negative bias voltage to the power supply switching transistor regardless of the power supply output voltage.

Yet another object of the present invention is to provide a current-mode controlled power supply which includes positive drive means for providing a positive bias voltage to the power supply switching transistor during the conductive state and negative drive means for providing negative bias voltage to the power supply switching transistor during the non-conductive state.

Still another object of the present invention is to provide a current-mode controlled power supply where the positive drive means and negative drive means constitute independently controlled circuit elements which are automatically switched in and out of the power supply circuit in response to each polarity reversal of the inductor feedback winding.

Still another object of the present invention is to provide a current-mode controlled power supply in which the $N_s/N_f$ inductor turns ratio is controlled to provide a minimum magnitude negative polarity feedback winding voltage which exceeds the optimum negative bias voltage level for the power supply switching transistor.

Still another object of the present invention is to provide a current-mode controlled power supply having an operating efficiency exceeding eighty percent.

Briefly stated, and in accord with one embodiment of the invention, a current-mode controlled power supply delivers current to an intermittently energized load. The power supply includes a coupled inductor having a primary winding and a secondary winding. A switching transistor is coupled in series with the primary winding for switching between conductive and non-conductive states to control the flow of current through the primary winding. Positive drive means is coupled to the base of the transistor for providing a positive bias voltage to the transistor to switch into and maintain the transistor in the conductive state where energy is transferred into the inductor. Current limiting means is coupled to sense the base voltage of the transistor for measuring the primary winding current and for removing the positive bias voltage from the transistor when the primary winding current reaches a predetermined value to thereby switch the transistor out of the conductive state and into the non-conductive state. A load is coupled to the secondary winding for receiving energy stored in the inductor after the transistor has been switched into the non-conductive state by the current limiting means.

In another embodiment of the invention, the inductor further includes a feedback winding and the power supply includes negative drive means. The negative drive means is coupled between the feedback winding and the base of the switching transistor to supply a constant negative bias voltage to the transistor as energy is transferred from the inductor into the load. The negative bias means provides a constant negative bias voltage to the switching transistor even though the power supply output voltage and the voltage across the feedback winding varies.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIGS. 4A, 4B and 4C represent a series of voltage versus time plots where the time axis of each of the three graphs is identical. FIG. 4A specifically illustrates the manner in which the output or load voltage of the power supply varies with time. FIG. 4B represents a simultaneous plot of several parameters including feedback winding voltage, positive bias voltage and negative bias voltage provided by the power supply of the present invention. FIG. 4C plots the feedback winding voltage, positive bias voltage and negative bias voltage provided by a prior art power supply.

DESCRIPTION OF THE PREFERRED EMBODIMENT

In order to better illustrate the advantages of the invention and its contributions to the art, a preferred hardware embodiment of the invention will now be described in some detail.

Figure 1A:
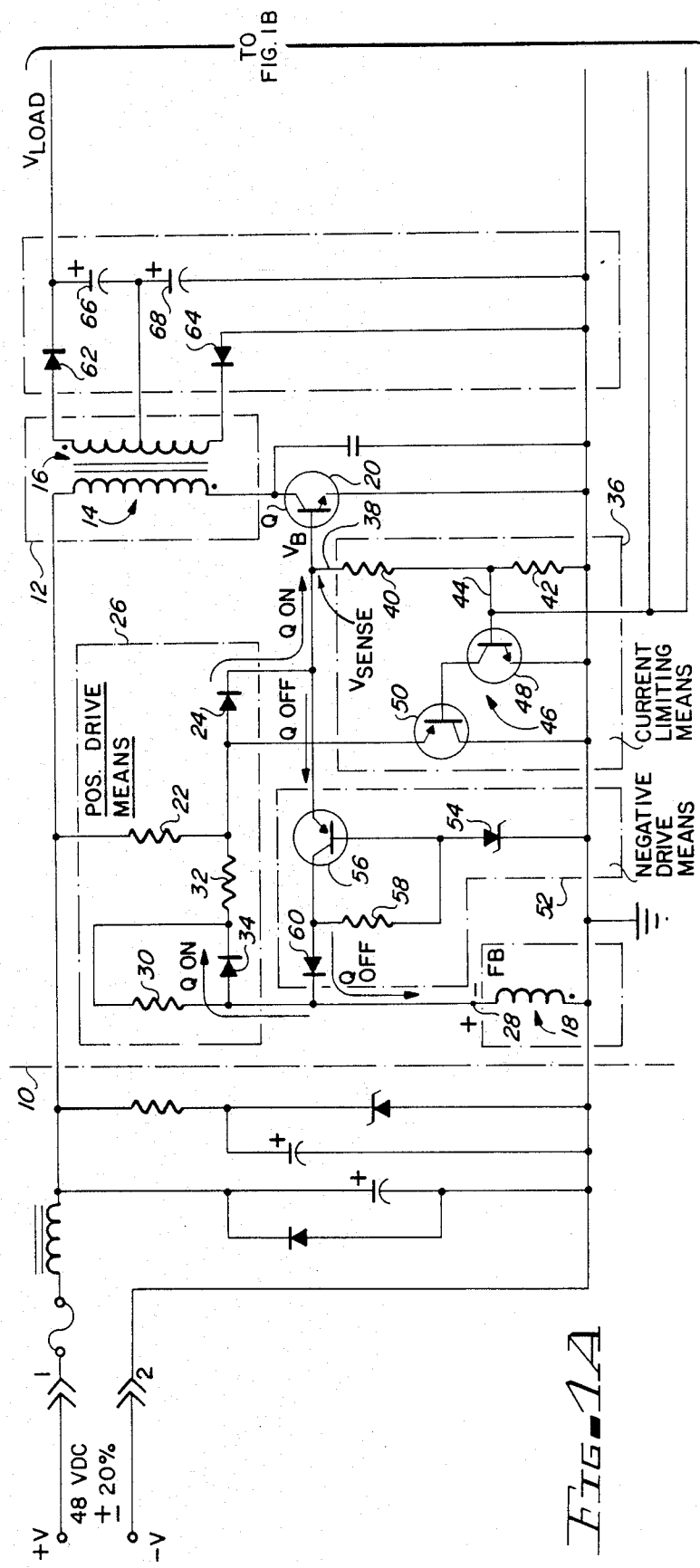
FIGS. 1A and 1B represent an electrical schematic diagram of a preferred embodiment of the current-mode controlled power supply of the present invention. In the embodiment illustrated, the power supply includes an intermittently energized load in the form of a strobe flash lamp.
Figure 2:
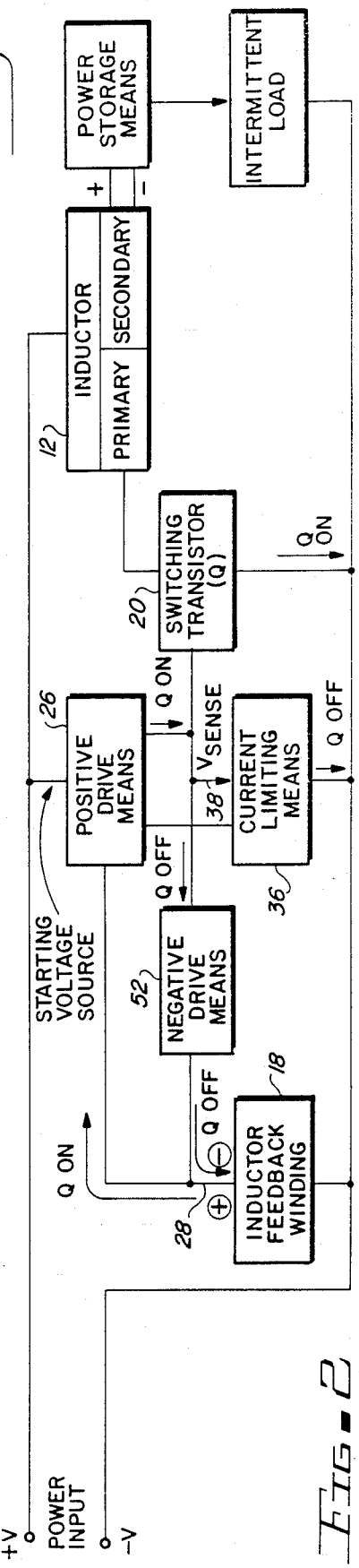
FIG. 2 represents a generalized block diagram depiction of the power supply illustrated in FIGS. 1A and 1B.

Referring now to FIGS. 1A and 2, the current-mode controlled power supply of the present invention receives a DC power input at the input terminals designated as "+V" and "−V". In connection with the preferred embodiment of the invention to be described below, a 48 volt DC input voltage is assumed and will determine the specific component values and ratings and the inductor turns ratios. The fuse, inductor, diodes, capacitors and resistor depicted to the left of the vertical dotted line 10 perform standard power supply voltage conditioning and circuit protection functions and will not be described in detail.

Coupled inductor 12 includes a primary winding 14, a center tapped secondary winding 16 and a feedback winding 18. The black dot which appears at one end of each of these windings represents a conventional symbol for indicating winding polarity. The number of turns utilized in each winding of inductor 12 is abbreviated as follows: $N_p$=number of turns in primary winding; $N_s$=number of turns in secondary winding; and $N_f$=number of turns in feedback winding.

A switching transistor designated both by reference number 20 and by reference letter "Q" is coupled in series with primary winding 14 of inductor 12. When the power supply is initially energized, the input voltage +V is applied to primary winding 14 and to the collector of switching transistor Q. Resistor 22 and diode 24 form a part of a positive drive supply or positive drive means 26 and provide a current flow path to supply a source of positive starting bias voltage to the base of switching transistor Q. Diode 24 of positive drive means 26 serves as isolating means for isolating positive drive means 26 from the base of switching transistor Q when the switching transistor is in the non-conductive state.

In response to the initial starting bias voltage, switching transistor Q switches from the non-conductive state into the conductive state where the level of current through primary winding 14 of coupled inductor 12 begins to increase from a zero level. Commencement of current flow through primary winding 14 induces a positive voltage in feedback winding output terminal 28 to the input of positive drive means 26. This positive feedback voltage flows through resistors 30 and 32 and through diodes 34 and 24 and provides a higher level fixed positive bias voltage to the base of switching transistor Q as long as transistor Q remains in the conductive state. While Q remains in the conductive state, energy from the DC power input source is transferred into inductor 12.

Figure 3:
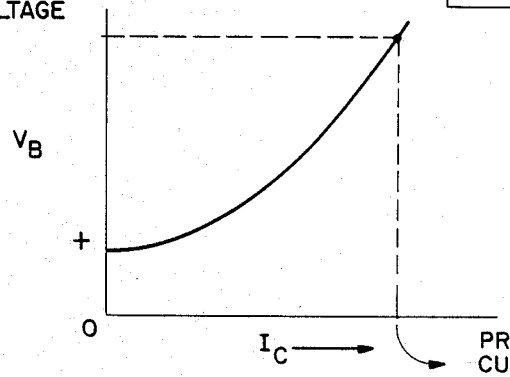
FIG. 3 is a graph depicting the monotonically increasing collector current versus base voltage for the power supply switching transistor.

Current limiting means or current limiting circuit 36 includes a voltage conductor 38 which is coupled to sense the base voltage on switching transistor Q. As a result of the monotonically increasing relationship between the switching transistor collector current and base voltage as illustrated in FIG. 3, a predictable, fixed relationship exists between base voltage and collector current. In the current-mode controlled power supply system of the present invention, it is necessary to transition switching transistor Q from the conductive state into the non-conductive state when the switching transistor collector current reaches a threshold value. This threshold value is set at a level which prevents saturation of the magnetic core of inductor 12 and also protects switching transistor Q from potentially destructive overcurrent conditions. Once the appropriate limiting collector current has been selected for switching transistor Q, the FIG. 3 collector current to base voltage transfer curve yields a base voltage which corresponds to the desired collector current limit. Current limiting means 36 is therefore configured to remove the positive bias voltage produced by positive drive means 26 when the primary winding current reaches a predetermined value by sensing the base voltage of switching transistor Q. Removal of this positive bias voltage switches transistor Q out of the conductive state and into the non-conductive state.

Current limiting means 36 includes voltage scaling means in the form of a voltage divider network consisting of resistors 40 and 42. The output of this voltage scaling means is coupled to the input terminal 44 of switching means or semiconductor switch 46 consisting of a first transistor switch 48 and a second transistor switch 50. Resistors 40 and 42 are selected to produce a specific scaled output voltage on control lead or input terminal 44 of switchig means 46 when the selected peak switching transistor base voltage is sensed at voltage conductor 38. At this threshold voltage level, first switching transistor 48 is switched into the "on" state, activating second transistor switch 50. The emitter terminal of second transistor switch 50 is coupled between resistor 32 and diode 24 and when activated shunts to ground the positive bias voltage produced by positive drive means 26. Removal of this positive bias voltage from the base of switching transistor Q immediately commences the process of switching switching transistor Q out of the conductive state and into the non-conductive state.

As soon as the primary winding current level begins to decrease as a result of removal of the positive bias from switching transistor Q, the polarity on output terminal 28 of feedback winding 18 switches from a positive voltage to a negative voltage as indicated by the voltage polarity symbols in FIGS. 1A and 2. Feedback winding 18 is designated to include a sufficient number of turns such that this instantaneous negative feedback voltage is of a sufficient magnitude to energize negative drive means 52 to immediately provide a specific, fixed negative bias voltage to the input or base terminal of switching transistor Q. In the preferred embodiment of the invention, negative drive supply or negative drive means 52 is configured as a voltage regulator in the form of a series pass voltage regulator. This voltage regulator includes a zener diode 54, a transistor 56, a resistor 58 and a diode 60. The cathode of zener diode 54 is coupled to the positive polarity terminal of feedback winding 18 as illustrated in FIG. 1A.

The removal of the positive bias voltage from the base terminal of switching transistor Q and the nearly simultaneous provision of an optimized, fixed negative biased voltage on that same terminal rapidly depletes the base-emitter stored charge on switching transistor Q and causes this transistor to switch from the conductive state into the non-conductive state at a speed substantially faster than if either no negative bias voltage were applied or if a negative bias voltage having a magnitude less than an optimized fixed value were applied. Switching transistor Q therefore switches at speeds comparable to substantially more expensive, higher grade switching transistors, permitting significant reductions in the overall cost of the power supply of the present invention. Negative bias also increases the collector to emitter breakdown voltage of transistor Q, thereby increasing the ability of the circuit to accept transient voltages.

At a predetermined time after switching transistor Q has been in the non-conductive state, the current through primary winding 14 drops to a level which causes the negative output voltage from feedback winding 18 to drop below the minimum voltage input requirement for negative drive means 52. When this happens, the fixed negative bias voltage from negative drive means 52 is removed from the base of switching transistor Q. At that same time, current flow through resistor 22 and diode 24 of positive drive means 26 positively biases the base of switching transistor Q and once again switches transistor Q into the conductive state as described above.

During the entire time that negative drive means 52 maintains switching transistor Q in the non-conductive state, the energy previously stored in inductor 12 during the conductive state is transferred from primary winding 14 into secondary winding 16. The energy thus transferred flows through diodes 62 and 64 and provides an incremental charge to energy storage capacitors 66 and 68. During each sequential interval that switching transistor Q is in the non-conductive state, the incremental charge level on capacitors 66 and 68 increases such that the resulting power supply output or load voltage increases from a zero level to a predetermined desired output level. A plot of load voltage versus time is illustrated in FIG. 4A.

Referring now to FIGS. 4A, 4B and 4C, the operation of the present invention and the advantages over prior art systems will be explained in detail.

FIG. 4B plots the voltage produced at output terminal 28 of feedback winding 18 versus time. When the power supply is initially energized as described above, the positive voltages generated at output terminal 28 of feedback winding 18 energizes positive drive means 26 to provide the initial pulse of a positive bias voltage designated by reference number 70. When current limiting means 36 disconnects the positive bias voltage from switching transistor Q, the output terminal of feedback winding 18 generates the negative feedback winding voltage designated by reference number 72. This negative feedback winding voltage provides the input power source to negative drive means 52 which generates a regulated, constant negative bias voltage designated by reference number 74. Although the voltage level designated by reference number 74 is depicted as a continuous line, it should be understood that the negative bias output signal from negative drive means 52 will occur in pulses existing only during each negative polarity feedback winding output pulse of the type designated by reference number 72.

In designing inductor 12, it is necessary to configure the $N_s/N_f$ turns ratio such that the first negative feedback winding voltage pulse designated by reference number 72 exceeds the desired fixed negative bias voltage level designated by reference number 74. If this relationship is not maintained, negative drive means 52 will not operate since the input voltage will be less than the breakdown voltage of zener diode 54.

In FIG. 4B, the fixed negative bias voltage level 74 generated by negative drive means 52 is illustrated as being a predetermined level below the avalanche voltage designated by reference number 76. If a negative bias voltage equal to or greater than avalanche voltage 76 is applied to switching transistor Q, the transistor will immediately transition into the avalanche breakdown region where excessive current levels and excessive transistor heating levels are experienced which may lead to transistor failure. On the other hand, it is desirable to have sufficiently high level negative bias voltage to provide for rapid switching from the conductive into the non-conductive state to enhance circuit stability to increase transient resistance, to reduce transistor heating and to generally maximize operating efficiency. The negative bias voltage level designated by reference number 74 has therefore been referred to as an "optimized" negative bias voltage since the negative bias voltage can easily be controlled by an appropriate negative drive means component selector in combination with an appropriate selection of the $N_s/N_f$ turns ratio. Generally, this "optimized," fixed negative bias voltage will be chosen to be close to but slightly below the avalance breakdown voltage of switching transistor Q. In the 48 VDC embodiment of the invention, negative drive means 52 produces a constant negative five volt bias level.

Provision of a controlled, constant magnitude negative bias voltage in prior art current-mode controlled power supplies has not previously been possible. As illustrated in FIG. 4C, prior art current-mode controlled power supplies typically provide a monotonically increasing negative bias voltage. The initial negative bias voltage illustrated by reference number 78 is of a very low level which potentially causes circuit instability, power loss, heating and generally inefficient operation. Only after numerous switching cycles do prior art current-mode controlled power supply systems attain the optimized fixed negative bias level indicated by reference number 80. This increasing magnitude negative bias voltage is proportional to the load voltage depicted in FIG. 4A and continues to increase with time. At the time designated by reference number 82, the monotonically increasing negative bias voltage provided to the switching transistor exceeds the avalanche breakdown voltage potentially causing damage to the transistor and rendering circuit operation highly inefficient. With these prior art systems, the $N_s/N_f$ turns ratio is controlled to limit the time to the right of reference number 82 where switching transistor Q operates in the avalanche breakdown mode. A direct result of this design criteria is that the monotonically increasing negative bias voltage produced between time zero and the time interval designated by reference number 80 is less than the optimum negative bias voltage operating level. Only during the time interval between times designated by reference numbers 80 and 82 does the prior art current-mode controlled power supply provide negative bias voltage levels near the "optimized" level provided by the present invention.

Figure 1B:
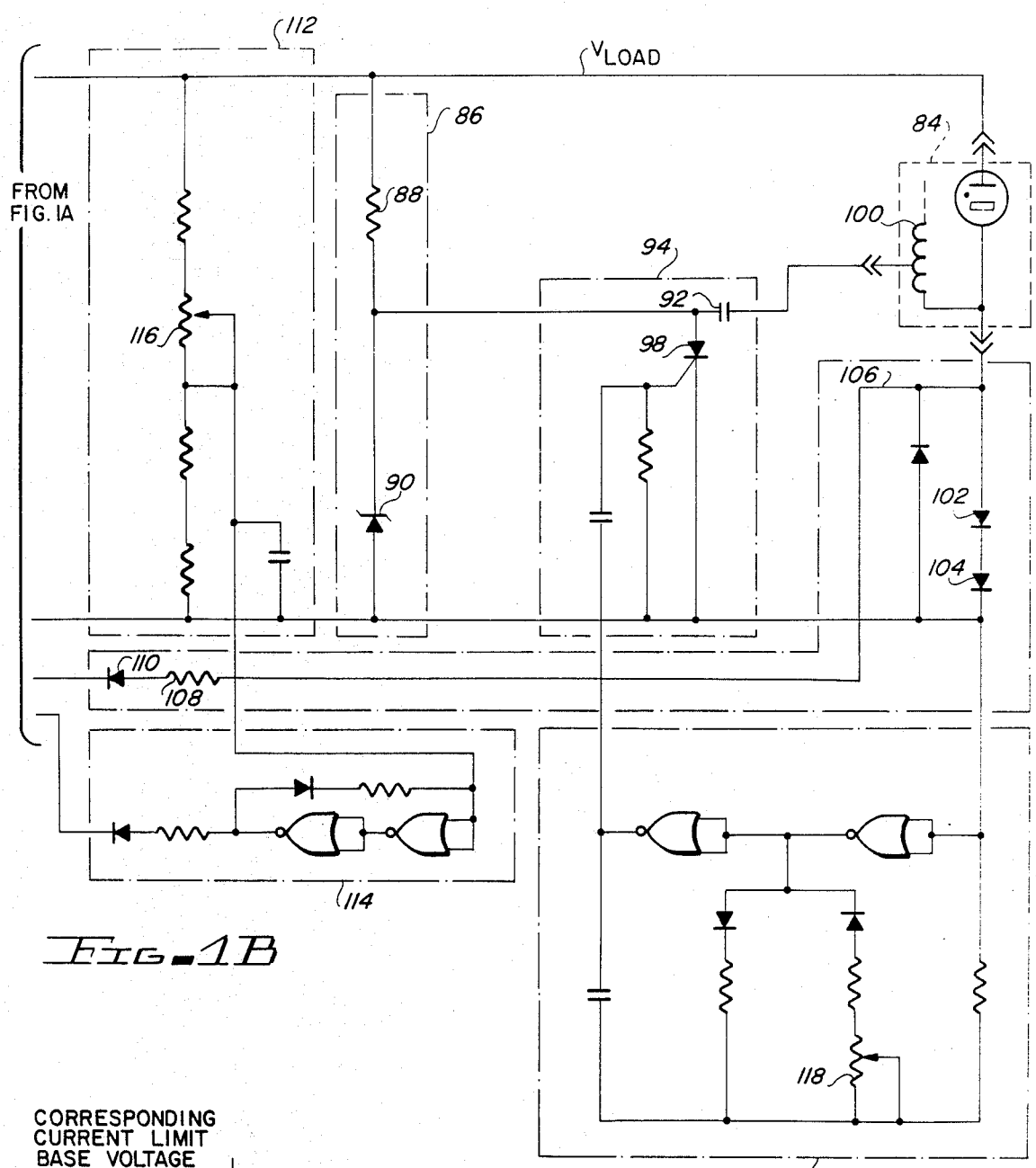

The current-mode controlled power supply depicted in FIG. 1A can be utilized to energize a variety of different intermittently energized loads. In FIG. 1B, the power supply of the present invention is coupled to a conventional strobe lamp system. The circuitry depicted in FIG. 1B performs the function of triggering and then energizing strobe lamp 84 after the output voltage of the FIG. 1A power supply reaches a predetermined desired output voltage. In the embodiment depicted, strobe lamp 84 is energized after the power supply output voltage has reached five hundred seventy volts. Network 86 includes a resistor 88 and a zener diode 90 and provides charging current to capacitor 92 which forms a part of trigger pulse generator circuit 94. Timing generator 96 periodically generates an output pulse which actuates SCR 98 and discharges capacitor 92 through trigger transformer 100. Trigger transformer 100 generates a high voltage output pulse which ionizes the Xenon gas in the strobe lamp which permits the energy stored in capacitors 66 and 68 to flow through strobe lamp 84 and create a bright flash of light.

Passage of the high level strobe flash current through series coupled diodes 102 and 104 generates a voltage pulse on the order of three volts on voltage conductor 106 which is routed through resistor 108 and diode 110 to the voltage input terminal 44 of switching transistor 48. This voltage pulse actuates current limiting means 36 and either transitions switching transistor Q into the non-conductive state or maintains it in the non-conductive state for the duration of the current pulse through strobe lamp 84. This disable signal prevents the power supply from continuously applying energy to the lamp, thereby preventing continuous ionization of the lamp.

The output of voltage divider network 112 is coupled to disabling circuit 114. Potentiometer 116 is adjusted so that disabling circuit 114 is actuated to generate an output pulse when the load voltage has reached the desired level which in the preferred embodiment being described is equal to five hundred seventy volts DC. The output pulse from disabling circuit 114 is coupled to input terminal 44 of switching transistor 48 and holds switching transistor Q in the non-conductive state.

Timing generator 96 periodically generates an output pulse which triggers SCR 98 as described above. Potentiometer 118 controls the pulse repetition rate of timing generator 96 and sets the flash rate of strobe lamp 84. In the preferred embodiment of the invention, potentiometer 116 is set to cause the power supply to generate a five hundred seventy volt VDC output voltage while potentiometer 118 is set to create an output pulse every 0.75 seconds.

Coupled inductor 12 as used in the specific embodiment of the present invention described above is fabricated according to the following specifications: Bobbin-Cosmo No. 2-5570 with pin numbers 1, 4, 7, 8 and 10 in place; Pot Core-Stackpole Code 55-0762, grade C/24B 0244, gapped .015 inches; windings fabricated from Phelps Dodge Nyleze film coated copper wire; secondary winding—124 turns center tapped, #29 AWG, inductance=6.8 mH; primary winding—53 turns, #22 AWG, inductance=1.3 mH; feedback winding—6 turns #26 AWG, inductance=28 μH; winding order: first winding-secondary; second winding-feedback; third winding-primary.

The following table recites the component values utilized in fabricating the power supply described above and illustrated in FIG. 1A:

| REFERENCE NO. | PART NO./VALUE |
|---|---|
| Transistors | |
| 56 | MPSA92 |
| 50 | D45C1 |
| 48 | MPS6531 |
| Q | MJ16002 |
| Diodes | |
| 24 & 34 | 1N4006 |
| 60, 62 & 64 | FR155 |
| 54 | 1N4733 |
| Resistors | |
| 30 | 1kΩ |
| 32 | 10kΩ |
| 22 | 15kΩ |
| 40 | 5.6kΩ |
| 42 | 10kΩ |
| Capacitors | |
| 66 & 68 | 200 μF, 300 volts |

The power supply of the present invention achieves a substantially enhanced efficiency level in comparison to commonly available prior art units. For example, when the power supply of the present invention is coupled to the strobe system depicted in FIG. 1B, an efficiency level determined by the ratio of the power output versus the power input is equal to eighty-seven percent. Utilization of a prior art power supply of the type illustrated in U.S. Pat. No. 4,321,507 produces an operating efficiency of fifty-eight percent. Comparing the eighty-seven percent efficiency of the present invention with the fifty-eight percent efficiency of the prior art device identified above indicates that the present invention achieves a fifty percent increase in operating efficiency.

This substantially enhanced power supply operating efficiency is achieved as a result of the cooperative relationship of several different elements of the present invention. The prior art strobe power supply illustrated in U.S. Pat. No. 4,321,507 utilizes a current transformer having a magnetic core and a primary winding which is coupled in series with a switching transistor. Such current transformer losses are eliminated with the present invention which measures the inductor primary winding current level by sensing the switching transistor base voltage. In addition, the current limiting means used in the present invention provides precisely accurate, repetitive operation. This concise control peak inductor primary current prevents saturation of the inductor magnetic core and provides a controllable safety margin for sensitive active devices such as switching transistor Q. The amount of energy transferred into the primary winding 14 of inductor 12 can also be precisely controlled on a repeatable basis to enhance the overall operating efficiency.

The negative drive means of the present invention provides an optimum, fixed negative bias voltage during the entire charging operation. The availability of the optimized bias voltage allows the rapid depletion of stored charge from the base-emitter junction of the switching transistor without causing base-emitter junction avalanche. This increases the transistor switching speed and collector-emitter breakdown voltage without overly increasing transistor temperature rise and without wasting stored transformer energy as energy is transferred to the secondary load. This feature greatly enhances efficiency and reliability and also allows the use of lower speed switching transistors to decrease cost.

A very unique aspect of the present invention resides in the fact that positive drive means 26 is configured such that it receives energy from output terminal 28 of feedback winding 18 only when this output terminal provides a positive polarity output voltage. In a similar manner, negative drive means 52 is configured such that it receives energy from feedback winding 18 only when a negative output voltage is available on output terminal 28 of feedback winding 18. The power supply of the present invention therefore utilizes the automatically switched voltage polarities available at output terminal 28 of feedback winding 18 to provide a switching function for switching positive drive means 26 into the circuit while simultaneously switching out negative drive means 52 and for subsequently switching out positive drive means 26 while switching in negative drive means 52. This automatic, synchronized switching feature of the present invention ensures that positive drive means 26 will be coupled to the base of switching transistor Q when that transistor is in the conductive state and that negative drive means 52 will be coupled to the base of switching transistor Q only when the switching transistor is in the non-conductive state. As a result, a highly efficient, low cost current-mode controlled power supply system is achieved while utilizing only a minimum number of discrete circuit components.

It will be apparent to those skilled in the art that the disclosed current mode controlled power supply may be modified in numerous ways and may assume many embodiments other than the preferred form specifically set out and described above. For example, numerous different types of regulator circuits other than the series pass regulator circuit depicted in FIG. 1A may be utilized to function as negative drive means 52. Various different configurations of current limiting means 36 other than the specific two transistor circuit depicted would also be readily apparent to one of ordinary skill in the art. Positive drive means 26 could take numerous different configurations which would readily be apparent to one of ordinary skill in the art. Although the power supply of the present invention has been depicted as energizing a strobe flash system, numerous other different types of loads could be coupled to the output terminals of the power supply depicted in FIG. 1A. Accordingly, it is intended by the appended claims to cover all such modifications of the invention which fall within the true spirit and scope of the invention.

I claim:

1. Apparatus for delivering current to an intermittently energized load comprising:
   a. a coupled inductor including a primary winding a secondary winding and a feedback winding;
   b. a switching transistor having base, collector and emitter terminals and a base-emitter junction and being coupled in series with said primary winding for switching between conductive and non-conductive states to control the flow of current through said primary winding;
   c. a positive drive supply coupled between said feedback winding and the base of said switching transistor and energized by said feedback winding for providing a positive bias voltage to said switching transistor to switch into and maintain said switching transistor in the conductive state to transfer energy into said inductor;
   d. a current limiting circuit for removing the positive bias voltage from said switching transistor when the primary winding current reaches a predetermined value to thereby switch said switching transistor out of the conductive state and into the non-conductive state, said current limiting circuit including
      i. a semiconductor switch having a control lead with a threshold voltage;
      ii. a voltage divider coupled across the base-emitter junction of said switching transistor for applying a scaled output voltage to the control lead of said semiconductor switch to cause said semiconductor switch to conduct when the base-emitter voltage of said switching transistor reaches a predetermined current limit voltage representative of a preselected switching transistor collector current limit;
      iii. said semiconductor switch shunting the positive bias voltage away from the base of said switching transistor when the voltage on the control lead rises above the threshold voltage to switch said transistor out of the conductive state and into the non-conductive state; and
   e. a load coupled to said secondary winding for receiving energy stored in said inductor after said switching transistor is switched into the non-conductive state by said current limiting circuit.

2. The apparatus of claim 1 wherein said semiconductor switch comprises a first transistor switch having base, collector and emitter terminals and wherein the base terminal of said first transistor switch functions as the control lead of said semiconductor switch.

3. The apparatus of claim 1 further including positive and negative voltage input terminals and wherein the emitter terminal of said switching transistor is coupled directly to the negative voltage input terminal.

4. The apparatus of claim 1 wherein said positive drive supply further includes means for isolating said positive drive supply from the base of said switching transistor while said transistor is maintained in the non-conductive state.

5. The apparatus of claim 4 wherein said isolating means includes a diode.

6. The apparatus of claim 1 wherein said load includes a strobe flash lamp.

7. The apparatus of claim 6 further including a sensor for sensing the output voltage on said secondary winding and for activating said current limiting circuit when the output voltage reaches a predetermined level.

8. The apparatus of claim 6 further including a trigger pulse generator and a timing generator coupled to said trigger pulse generator for periodically energizing said strobe flash lamp.

9. The apparatus of claim 1 further including a negative drive supply coupled between said feedback winding and the base of said switching transistor for supplying a constant negative bias voltage to the base of said switching transistor independent of variations in the voltage across said feedback winding.

10. The apparatus of claim 9 wherein the constant negative bias voltage from said negative drive supply is set at a level less than the base-emitter avalanche voltage of said switching transistor.

11. The apparatus of claim 10 wherein said negative drive supply includes a voltage regulator.

12. The apparatus of claim 11 wherein the turns ratio of said secondary winding with respect to said feedback winding yields a feedback winding voltage which is always greater than said negative drive supply.

13. The apparatus of claim 9 wherein said positive drive supply further includes means for isolating said positive drive supply from the base of said switching transistor while said negative drive supply provides the negative bias voltage to said switching transistor.

14. The apparatus of claim 13 wherein said isolating means includes a diode.

15. Apparatus for delivering current to an intermittently energized load comprising:
   a. a coupled inductor including a primary winding a secondary winding and a feedback winding;
   b. a switching transistor having base, collector and emitter terminals and a base-emitter junction and being coupled in series with said primary winding for switching between conductive and non-conductive states to control the flow of current through said primary winding;
   c. a starting voltage source coupled to the base of said switching transistor for continuously applying a starting bias voltage to said switching transistor to periodically switch said switching transistor into the conductive state;
   d. a positive drive supply coupled between said feedback winding and the base of said switching transistor and energized by said feedback winding for providing a positive bias voltage to said switching transistor to maintain said switching transistor in the conductive state to transfer energy into said inductor, the magnitude of the positive bias voltage exceeding the magnitude of the starting bias voltage;
   e. a current limiting circuit for removing the positive bias voltage from said switching transistor when the primary winding current reaches a predetermined value to thereby switch said switching transistor out of the conductive state and into the non-conductive state, said current limiting circuit including
      i. a semiconductor switch having a control lead with a threshold voltage;
      ii. a voltage divider coupled across the base-emitter junction of said switching transistor for applying a scaled output voltage to the control lead of said semiconductor switch to cause said semiconductor switch to conduct when the base-emitter voltage of said switching transistor reaches a predetermined current limit voltage representative of a preselected switching transistor collector current limit;
      iii. said semiconductor switch shunting both the starting bias voltage and the positive bias voltage away from the base of said switching transistor when the voltage on the control lead rises above the threshold voltage to switch said transistor out of the conductive state and into the non-conductive state; and
   f. a load coupled to said secondary winding for receiving energy stored in said inductor after said switching transistor is switched into the non-conductive state by said current limiting circuit.

16. The apparatus of claim 15 wherein said apparatus includes a voltage input lead and wherein said starting voltage source includes a power input terminal coupled to said voltage input lead.

17. The apparatus of claim 15 further including a negative drive supply coupled between said feedback winding and the base of said switching transistor for supplying a negative bias voltage to the base of said transistor as energy is transferred from said inductor into said load.

18. The apparatus of claim 17 wherein said negative drive supply supplies a constant negative bias voltage to the base of said switching transistor as energy is transferred from said inductor into said load, wherein the negative bias voltage remains constant as the voltage across said feedback winding varies.

19. The apparatus of claim 18 wherein said semiconductor switch comprises a first transistor switch having base, collector and emitter terminals and wherein the base terminal of said first transistor switch functions as the control lead of said semiconductor switch.

20. The apparatus of claim 19 wherein said load includes a strobe flash lamp.

* * * * *